(12) United States Patent
Fencel

(10) Patent No.: US 6,764,430 B1
(45) Date of Patent: Jul. 20, 2004

(54) REAR ROLLER TREADMILL DRIVE WITH INTERNAL MOTOR, CONSOLE CONTROLLED VARIABLE SOFT DECK AND TORQUE BAR SIDE ELEVATION

(75) Inventor: Stanley Robert Fencel, Irvine, CA (US)

(73) Assignee: Scifit Systems, Inc., Tulsa, OK (US)

( * ) Notice: Subject to any disclaimer, the term of this patent is extended or adjusted under 35 U.S.C. 154(b) by 0 days.

(21) Appl. No.: 09/518,632

(22) Filed: Mar. 3, 2000

Related U.S. Application Data

(60) Provisional application No. 60/122,872, filed on Mar. 5, 1999.

(51) Int. Cl.[7] ............................................. A63B 22/00
(52) U.S. Cl. ...................................... 482/54; 482/51
(58) Field of Search ..................................... 482/51, 54

(56) References Cited

U.S. PATENT DOCUMENTS

| | | | |
|---|---|---|---|
| 2,915,167 A | | 1/1959 | Berger .......................... 198/127 |
| 4,350,336 A | * | 9/1982 | Hanford ......................... 482/54 |
| 5,088,596 A | | 2/1992 | Agnoff .......................... 198/788 |
| 5,279,528 A | * | 1/1994 | Dalebout et al. ............... 482/54 |
| 5,413,209 A | | 5/1995 | Werner .......................... 198/500 |
| 5,441,468 A | * | 8/1995 | Deckers et al. ................. 482/54 |
| 5,542,892 A | * | 8/1996 | Buhler ........................... 482/54 |
| 5,976,061 A | * | 11/1999 | Moon et al. .................... 482/54 |
| 5,993,358 A | * | 11/1999 | Gureghian et al. ............. 482/54 |

* cited by examiner

Primary Examiner—Glenn E. Richman
(74) Attorney, Agent, or Firm—Fellers, Snider, Blankenship, Bailey & Tippens, P.C.

(57) ABSTRACT

A motorized roller comprised of a commercial electric motor suspended inside a drive roller tube, drives via belt means, input of a integral two stage drive belt system adjacent to said motorized drive roller. Subsequently the output of two stage drive belt system is fed back to the motorized motor outside housing which in turn drives treadmill or conveyor continuous belt to move people or goods. Increased torque provided by two stage drive requires less horsepower.

The all belt, no gears, drive system absorbs shock, is quiet and has a low profile.

4 Claims, 4 Drawing Sheets

REAR ROLLER TREADMILL DRIVE WITH INTERNAL MOTOR, CONSOLE CONTROLLED VARIABLE SOFT DECK AND TORQUE BAR SIDE ELEVATION

CROSS-REFERENCES TO RELATED APPLICATIONS

U.S. Pat. Nos. Documents:

5,279,528
2,915,167
5,088,596
5,413,209
4,664,646

Foreign Patent Documents:

5,509,872

PRIORITY ClAIM

This application claims the benifit of U.S. Provisional Application Serial No. 60/122,872, filed Mar. 5, 1999.

STATEMENT REGARDING FEDERALLY SPONSORED RESEARCH OR DEVELOPMENT

Not applicable.

REFERENCE TO A MICROFICHE APPENDIX

Not applicable

BACKGROUND OF THE INVENTION

1. Field of the Invention

Motorized rollers (i.e. a roller with an internal motor) are common in the conveyor industry. Motorized rollers are not common in treadmills, which use an external motor to drive the roller.

2. Description of the Related Art

Present state-of-the-art in conveyor design uses an internal motor assembled in the conveyor roller tube. The internal motor drives gears and clutches that provide power to convey heavy loads. The requirement for gears and clutches makes this design relatively expensive.

The motorized rollers presently used by conveyors are not suited to treadmills because treadmills are very sensitive to cost, have extreme foot impact loads, require variable speeds, and have greater duty cycles. A 200 pound treadmill runner at 10 M.P.H. will have an inertia impact of three to four times his weight or about 700 pounds of localized foot impact on a moving belt above a non-moving deck at an approximate rate of one hundred (100) times a minute. Treadmills must support higher speeds and a more resilient drive coupled with lower costs than provided by current conveyer motorized rollers. Therefore, treadmills use belt drives which are quiet, absorb shock, cost effective, easy maintenance/assembly and more efficient through less loss of friction compared to gears. However, in order to implement these belt drives, it has been necessary up to now to mount drive motors externally on the front of the treadmill under a shroud. This increases profile of the treadmill (creating a front bulge that runners have to be careful to avoid) and also enlarges its footprint, wasting expensive gym floor space (see FIG. 4). Internal clutches are also required to prevent damage in case of sudden shock loads. Lastly, it is difficult to maintain belt tension because front roller drives pushes the runner on the belt rather than pulling said runner.

An in-depth search for treadmills revealed only one patent for treadmills that has a motor inside the roller (U.S. Pat. No. 5,509,872). In this patent, there are two motors and gears (not a belt drive). All production treadmill belt drives have the motor external (ref. U.S. Pat. No. 5,509,872 "PriorArt"). The two-motor device in U.S. Pat. No. 5,509,872 device does not appear to be in production.

BRIEF SUMMARY OF THE INVENTION.

This invention is a rear roller drive assembly that can be used either for treadmills or conveyor systems. An all-belt drive provides the shock absorption required in the heavy impact, high friction duty cycle required for treadmills. Any suitable electric motor may be suspended as a purchased entity and integrated inside a tube as a modular package coupled with a two stage all belt drive system. Suitable clearance between the inner tube walls and the suspended motor is maintained by the motor drive shaft, bearings and shafting affixed to the rear motor housing (see FIG. 1). A belt drive FIGS. 1 and 2, absorbs shock loads. No clutches required. The resiliency of a belt drive ensures quiet operation even when coupled with high motor speeds. The two-stage reduction in FIG. 1, provides for a wide range of torque transmission. The non-rotating support shaft of the running belt drive roller is locked to the frame with a centering bracket such as a "V" shaped groove which in effect holds the shaft in position longitudinally as well as radially (see FIG. 3) This rigid horizontal bracket supports the suspended motor; prevents motor shaft from rotating and permits one bearing to support one end of the housing of the motor without putting a load on the motor assembly.

Space saved by an internal motor suspended in the treadmill rear drive roller provides a means to pull rather than push treadmill walking or running belt. Pushing a belt requires higher belt tensions (to prevent slipping) which in turn results in subsequently higher bearing radial loading.

Opposite clutch coupling and complete commercial motor entity facilitates motor removal and maintenance. All the efficiency, performance, and advantages in this belt drive are applicable in motorized rollers for powered conveyor systems.

DETAILED DESCRIPTION OF THE INVENTION

Figure 1:
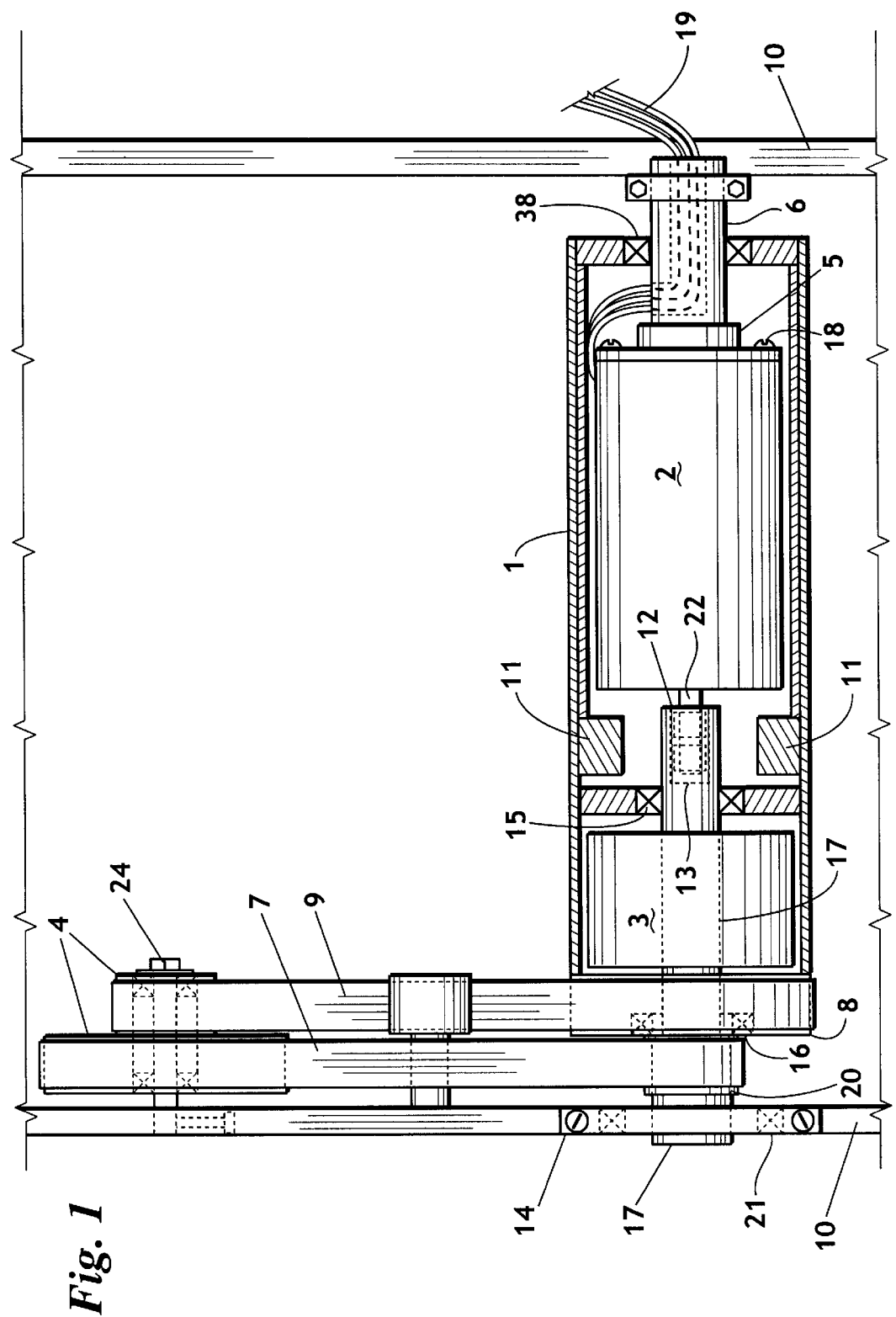
FIG. 1 is an internal view of the drive roller illustrating motor and flywheel suspension with support bearings. Top view of two-stage reduction belt drive is also illustrated in FIG. 1.

A motorized roller assembly, FIG. 1, drives treadmill or conveyor continuous belts to move people/goods.

Figure 3:
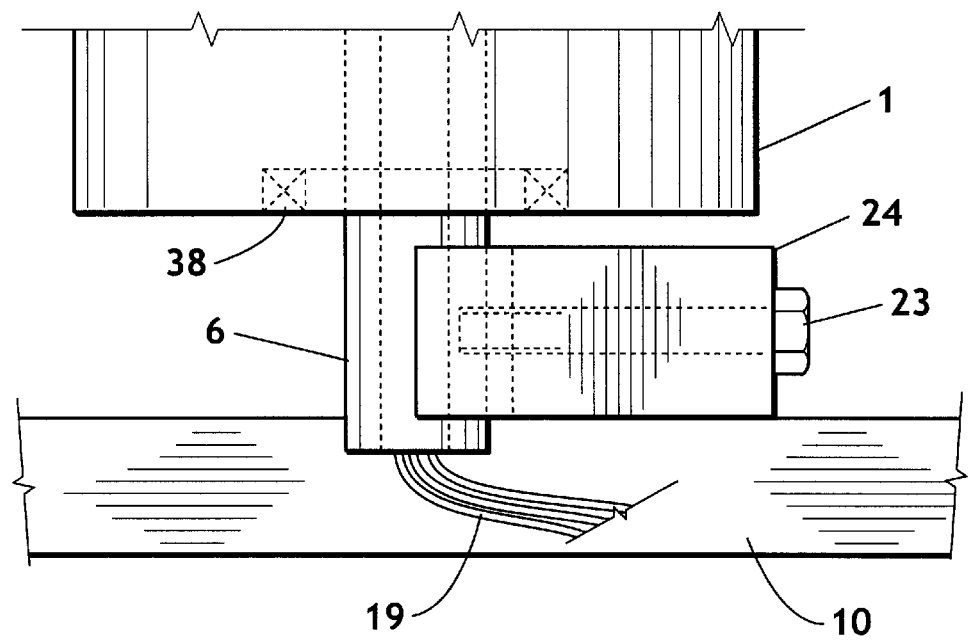
FIG. 3 illustrates rear roller support shaft method of retention to frame and how said shaft is prevented from rotating by a locking bolt.
Figure 3:
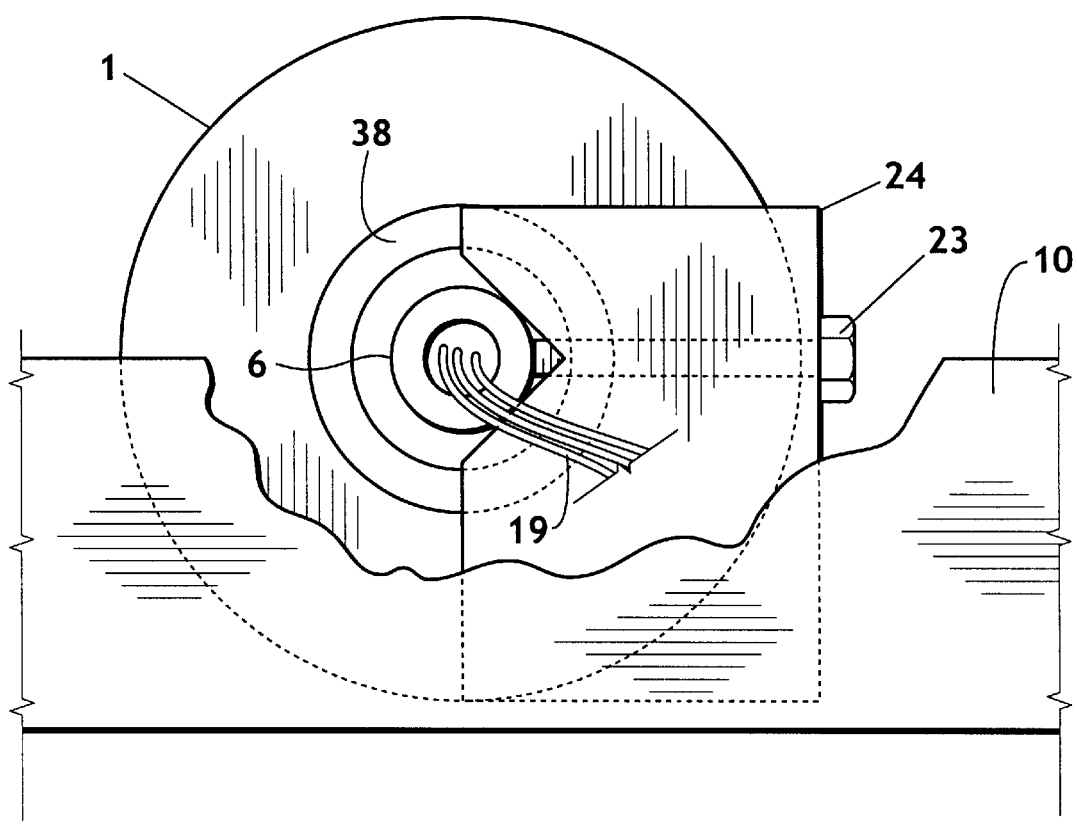
Figure 4:
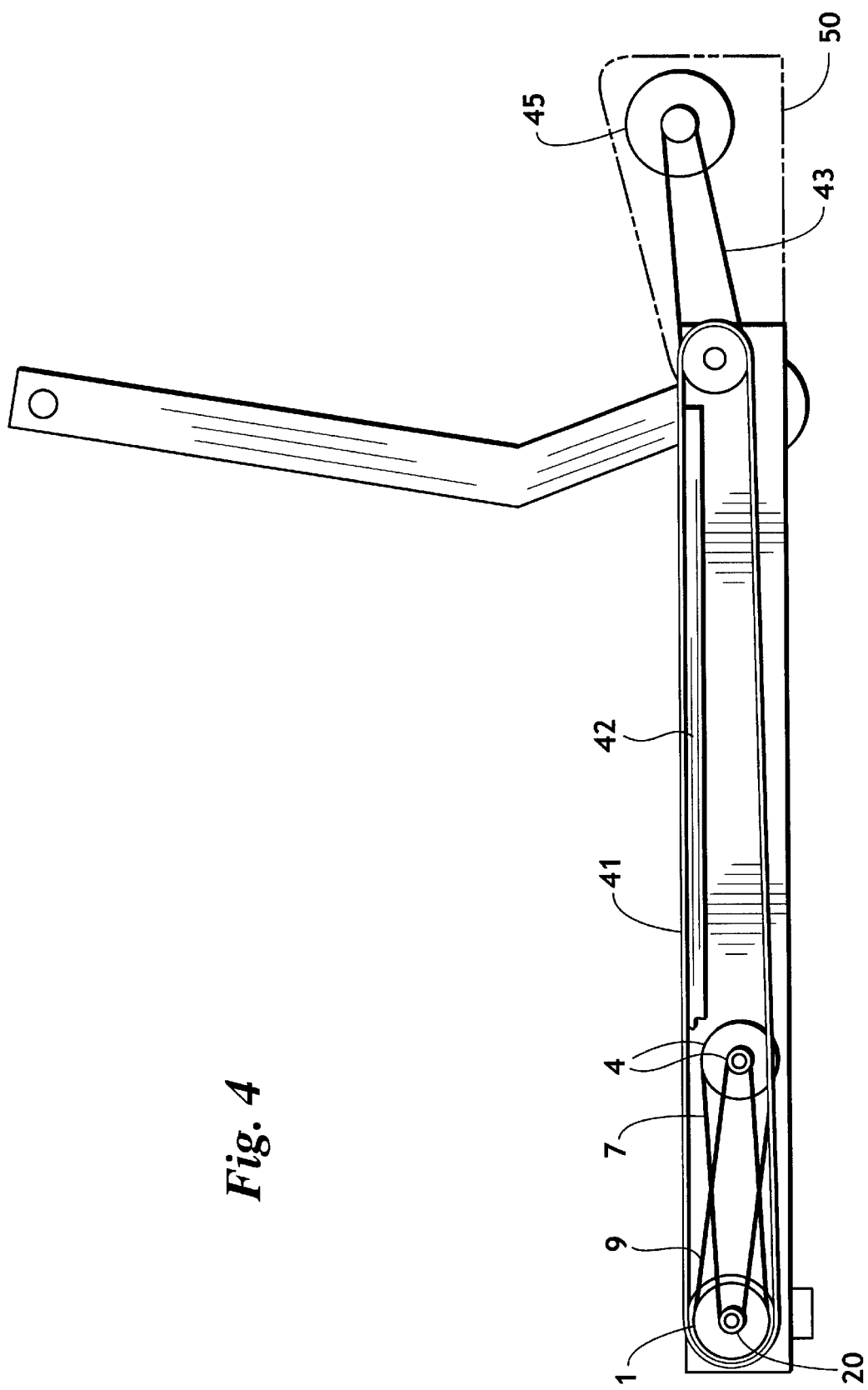
FIG. 4 illustrates motorized roller mounted in a typical treadmill frame and prior art in dotted lines illustrating length required for an external motor pushing exerciser and treadmill.

FIG. 1. Rear end bell of motor 2 is attached to Flange 5 by bolts 18 and prevents rotation and provides support of motor housing. Shaft 6, supported by bearing 38, secured to flange 5, is in turn bolted in V Notch block 24, with bolt 23, FIG. 3, which prevents said shaft and motor housing from rotating and damaging motor control wire bundle 19.

Main drive shaft 17, supported by bearings 15, and 16, has two identical over running clutches 12, and 13 pressed in one end of shaft 17, with opposite drive orientation so that each clutch prevents motor shaft 22, turning in either direction thereby coupling motor shaft 22 to main drive shaft 17. Motor 2 and its drive shaft 22, inserts in clutch coupling combination for a no backlash coupling installation in a restricted area.

Figure 2:
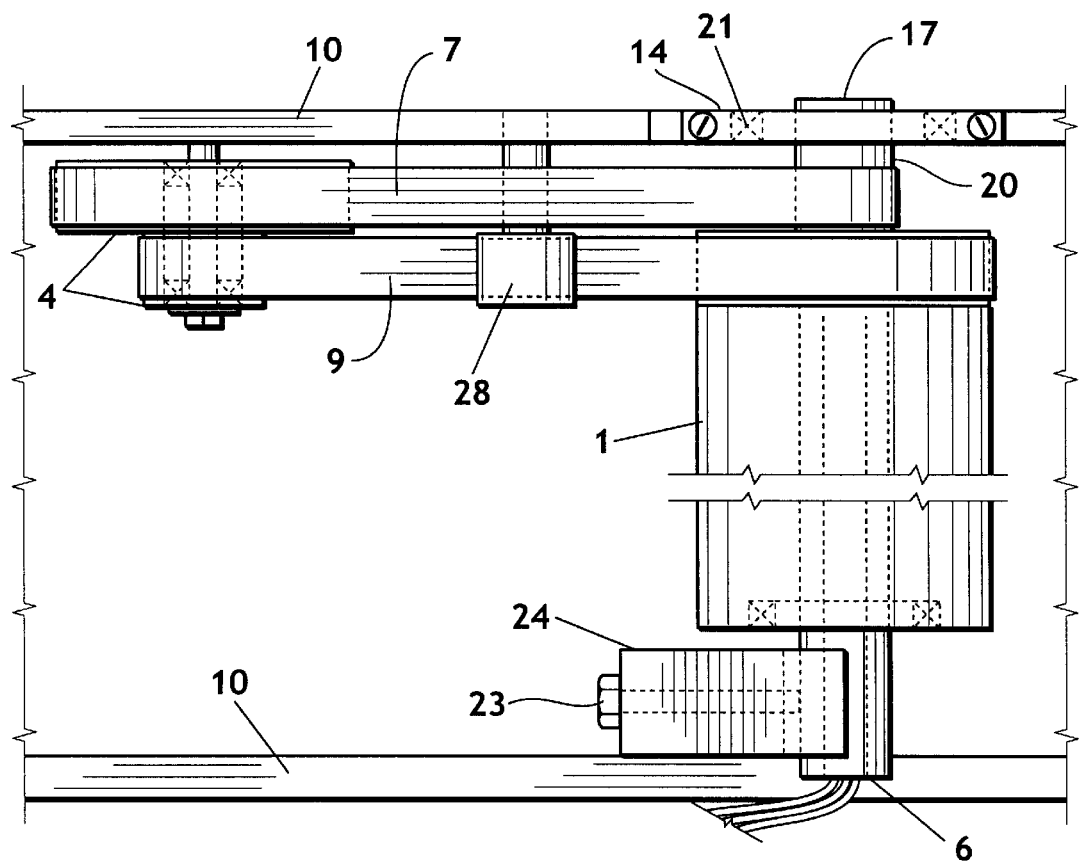
FIG. 2 illustrates side view of two-stage reduction belt drive with optional belt tension roller.
Figure 2:
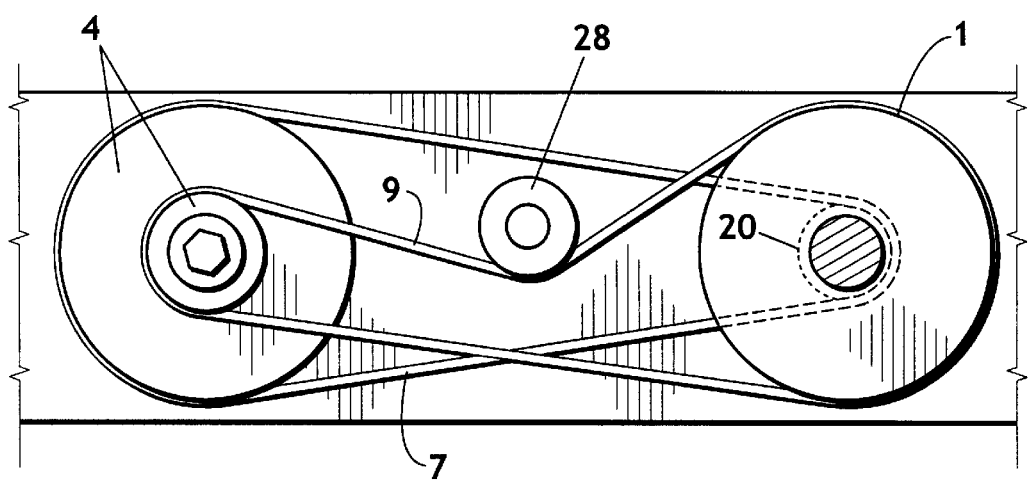

The opposite end of shaft 17 with belt drive pulley 20, is supported by bearing 21 in pillow block 14 in FIGS. 1 and 2.

When motor 2 is energized, its drive shaft 22 coupled by overriding clutches 12, and 13, to shaft 17, drives belt pulley 20 attached to shaft 17,, which in turn drives belt 7, which in turn drives large pulley of integrated two stage idler pulley assembly 4, which in turn drives integrated small pulley of pulley assembly 4, which in turn drives belt 9, which in turn drive power roller tube 1 through belt grooves 8 in tube 1 and provides the power of ratio to drives continuous belt for moving people or goods.

It should be noted a complete power roller assembly is depicted in FIG. 1 but if drive belts 7 and 9 are removed, will rotate freely on shaft 17, and bearing 16, which is mounted in bulkhead 11, which in turn is supported by pillow block 14 on one end and bearing 29 on shaft 6 on the other. It should also be noted that bearing 16 inner race and outer race rotate at different speeds but fortunately both race rotate in the same direction. Bearing 16 outer race is driven by the reduced speed of the power roller tube 1, and the inner race of bearing 16 is driven at the higher motor 2, in the same direction.

What is claimed is:

1. A motorized roller for a treadmill, or conveyor, having a frame, the motorized roller comprising:
    a cylindrical roller tube having a first end and a second end;
    a motor housed within said roller tube, said motor including:
        a motor housing; and
        a drive shaft;
    a first roller shaft nonrotatably secured to said motor housing and projecting from said first end;
    a second roller shaft projecting from said second end, said second roller shaft rotationally coupled to said drive shaft such that rotational motion of said drive shaft in a first direction will cause a like rotation of said second roller shaft in said first direction; and
    a pulley secured to said second roller shaft.

2. The motorized roller of claim 1 further comprising a first overrunning clutch, said first overrunning clutch received in a first end of said second roller shaft, said drive shaft engagingly received in said first overrunning clutch such that rotational movement of said drive shaft in said first direction will cause rotation of said second roller shaft in said first direction and rotational movement of said drive shaft in a second direction opposite said first direction will cause said first overrunning clutch to overrun.

3. The motorized roller of claim 2 further comprising a second overrunning clutch, said second overrunning clutch received in said first end of said second roller shaft, said drive shaft engagingly received in said second overrunning clutch such that rotational movement in said second direction will cause rotation of said second roller in said second direction.

4. A treadmill exercise apparatus comprising:
    a frame having first and second longitudinal members;
    a first roller rotatably mounted between said first and second longitudinal members
    a motorized roller having:
        a cylindrical housing having a first end and a second end;
        a first roller shaft extending from said first end, said first roller shaft being nonrotatably secured to said second longitudinal member;
        a second roller shaft extending from said second end, said second roller shaft being rotatably secured to said first longitudinal member;
        a first pulley nonrotatably secured to said second roller shaft between said second end and said first longitudinal member; and
        a motor housed within said cylindrical housing, said motor having an output rotationally coupled to said second roller shaft;
    a second pulley nonrotatably secured to said cylindrical housing;
    an idler pulley rotationally secured to said first longitudinal member;
    a first belt received over said first pulley and said idler pulley; and
    a second belt received over said idler pulley and said second pulley.

* * * * *